United States Patent [19]

Cassell

[11] Patent Number: 4,517,637
[45] Date of Patent: May 14, 1985

[54] DISTRIBUTED MEASUREMENT AND CONTROL SYSTEM FOR INDUSTRIAL PROCESSES

[75] Inventor: Douglas A. Cassell, Sherborn, Mass.

[73] Assignee: Inconix Corporation, Natick, Mass.

[21] Appl. No.: 487,041

[22] Filed: Apr. 21, 1983

[51] Int. Cl.³ ............................................. G06F 15/46
[52] U.S. Cl. .................................. 364/138; 364/551; 364/900
[58] Field of Search ............... 364/131, 132, 133, 134, 364/138, 139, 550, 551, 579, 200, 900; 340/825.06, 825.07, 825.22

[56] References Cited

U.S. PATENT DOCUMENTS

| | | | |
|---|---|---|---|
| 4,151,590 | 4/1979 | Azegami | 364/138 X |
| 4,152,760 | 5/1979 | Freitas et al. | 364/138 |
| 4,180,860 | 12/1979 | Driscoll et al. | 364/139 |
| 4,399,502 | 8/1983 | MacDonald et al. | 364/138 X |
| 4,424,559 | 1/1984 | Lorincz et al. | 364/138 X |

OTHER PUBLICATIONS

Cassell–"Integrating Measurement, Control, & Communications into an Intelligent Distributed Control System Component"–Proceedings of Micro-Delon '82–Fifth Annual Conference on Computer Technology–Univ. of Delaware–Mar. 9, 1982.

*Primary Examiner*—Joseph Ruggiero
*Attorney, Agent, or Firm*—Weingarten, Schurgin, Gagnebin & Hayes

[57] ABSTRACT

The disclosed invention includes at least one programmable industrial measurement and control device operable in a stand-alone mode to sequentially and repetitively sample a plurality of analog input channels and store in preselected memory locations digital data representative of corresponding channels, to repetitively evaluate a predetermined plurality of industrial measurement and control functions on said data, and to actuate selected output channels in accordance with the results of each of the evaluation iterations to provide real-time control of an industrial process. Means including a pointer controlled ROM work list, a ROM program directory, a ROM variables control, a RAM report control, a RAM function control, and a ROM program code table specify the time sequence of, and the data and control structures for, each evaluation iteration. A host system is connected to the devices via a local area network for operation in a shared resources mode, and may be either a processor or an interactive terminal. The local area network includes two shielded twisted wire cables. A CSMA/CD communications protocol is implemented. Gateways connect the host to the network, and connect peripheral devices such as printers or graphics displays to the network. In the shared resources mode, each node on the network may routinely prepare and send reports to the host representative of sensed industrial conditions, may respond to host system generated commands, and may prepare and send exception reports to the host system whenever the industrial process exceeds prescribed bounds.

12 Claims, 14 Drawing Figures

FIG. 10

DISTRIBUTED MEASUREMENT AND CONTROL SYSTEM FOR INDUSTRIAL PROCESSES

FIELD OF THE INVENTION

This invention is directed to the field of electrical control systems, and more particularly, to a distributed measurement and control system for industrial processes.

BACKGROUND OF THE INVENTION

Automated control systems for industrial processes such as the production of steel, petrochemicals, and synthetic fibers, among others, are operative in response to information representative of the current state of the industrial process to actuate preselected process controllers for maintaining the process within prescribed boundaries, and for providing out-of-bounds indications, among others. The heretofore known central control systems employed for this purpose having a special or general purpose computer connected to multiple input signal wires carrying information representative of sensed, plant floor conditions, and multiple output signal wires for actuating plant floor controllers and alarms are disadvantageous, among other reasons, due to the large expenditure of capital and manpower required during installation, the long delays in system aquisition often occasioned by lengthly management approval procedures, and the long and costly plant shut-downs typically occasioned by system malfunction. The heretofore known distributed measurement and control systems employed for this purpose having a remotely-positioned master, control processor that repetitively polls and commands a plurality of addressable, slave devices positioned about the plant floor and interconnected over a coaxial cable link are disadvantageous, among other reasons, due to the memory overhead and processing burdens placed on the master, control processor preventing it from attending other tasks, the slower than desireable control response times resulting from repetitive interrogation, computation, and command signal generation, and the high wiring, installation, and service costs involved.

SUMMARY OF THE INVENTION

The novel distributed measurement and control system for industrial processes of the present invention includes a plurality of programmable industrial measurement and control devices that are selectively connected via analog and digital input and output channels and ports to preselected continuous and discrete industrial sensors and actuators, and are individually operative in a stand-alone mode to provide digital data representative of the corresponding signals applied to its analog and digital input channels and ports, to evaluate a plurality of industrial measurement and control functions on the data, and to generate and apply output signals on its analog and digital output channels and ports, in accordance therewith, for controlling the industrial process. In a shared-resources mode, a local area network is provided for interconnecting the plurality of programmable industrial measurement and control devices that is capable of supporting multi-access, high-speed information transfer therebetween, and a host system is connected to the local area network for setting parameters used by individual ones of the programmable industrial measurement and control devices during function evaluation, for direct step-in control of selected analog and digital output ports and channels of selected ones of the programmable industrial measurement and control devices, and for monitoring the state of the input and output channels and ports of selected programmable industrial measurement and control devices, among other things. The programmable industrial measurement and control devices of the present invention assume a principal portion of the burden of industrial process control thus freeing the host system for other tasks, substantially eliminate undesirable control function signal generation delays typical of the heretofore known devices and systems, may be expeditiously installed and serviced, and after-installation changes to the industrial process may be readily incorporated.

The programmable industrial measurement and control devices of the present invention in preferred embodiment each include a processor, a plurality of analog input channels for receiving a plurality of analog input signals representative of continuous industrial process variables, means connected to the analog input channels for providing a like plurality of selectively conditioned analog signals, means responsive to the plurality of selectively conditioned analog signals for providing a like plurality of digital signals respectively representative of corresponding ones of the selectively conditioned analog signals, a plurality of output channels coupled to the processor for external connection to a plurality of industrial control actuators, and means responsive to the digital signals for repetitively evaluating a plurality of predetermined industrial control and measurement functions and for providing in accordance therewith output control signals to selected ones of the output channels for actuating the corresponding industrial controllers. The output channels preferably include both analog output channels and digital output ports for actuating and controlling both continuous and discrete industrial process actuators. Digital input channels, coupled to the processor, are provided for direct input of discrete industrial control variables. The digital signal providing means preferably includes a programmable gain amplifier connected to the processor and to the addressable analog input channels via an analog bus, a processor-controlled digital to analog convertor, and a comparator, one input of which is connected to the output of the programmable gain amplifier, and the other input of which is connected to the output of the digital to analog convertor. The function evaluation and control signal providing means preferably includes addressable blocks of EPROM registers coupled to the processor defining tables representing the instructions of a plurality of predetermined industrial measurement and control functions to be evaluated, a pointer-controlled work list for generating the evaluation sequence of the preselected industrial measurement and control functions, a variables control block for defining the data structures to be evaluated by each function, and an output control block for defining the output and control data structures for actuating preselected industrial controllers after function evaluation. A universal asynchronous receiver transmitter is coupled to the processor for full duplex information transmission and reception to and from the programmable industrial measurement and control devices over the local area network. The local area network preferably includes a "message" and a "carrier" twisted-wire cable pair. Messages are transmitted and received over the local area network time sequentially on the "message" twisted-wire cable pair to and from the host system, and between individual programmable industrial measurement and control devices. The "carrier" twisted-wire cable pair is used to implement a CSMA/CD communications protocol. A gateway is connected to the local area network to buffer messages sent from, and to, the host system, and to format information that is transferred between the host system and the local area network via a RS-232-C interface. The host system may be either a processor or an interactive terminal.

BRIEF DESCRIPTION OF THE DRAWINGS

Other advantages and features of the present invention will become apparent as the invention becomes better understood by referring to the following exemplary and non-limiting detailed description of the preferred embodiment, and to the drawings, wherein.

DETAILED DESCRIPTION OF THE PREFERRED EMBODIMENT

Figure 1:
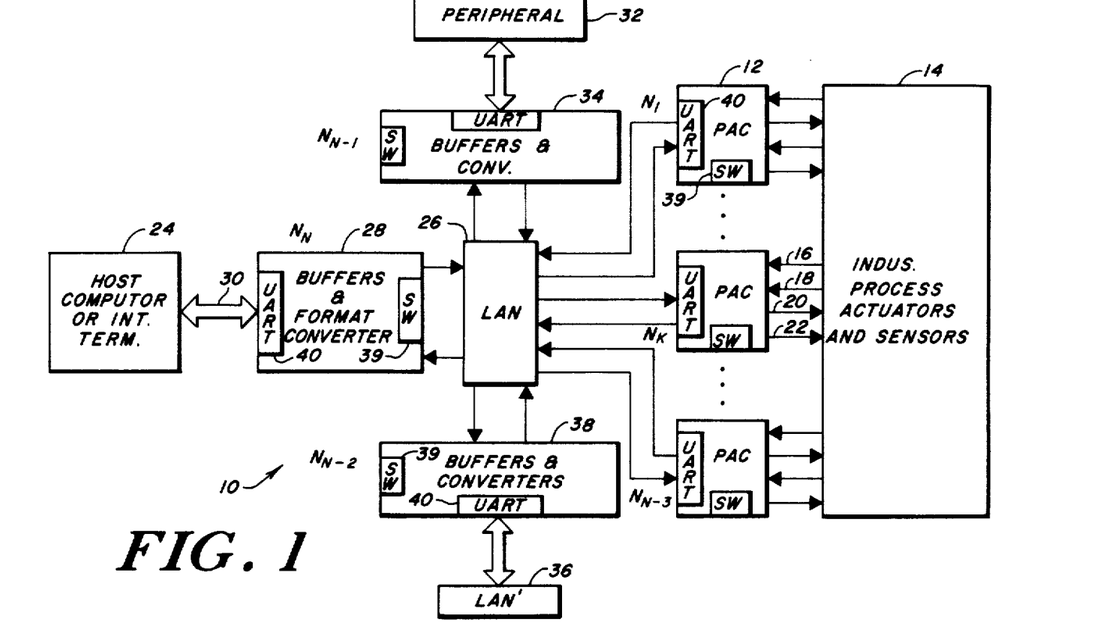
FIG. 1 is a block diagram illustrating the distributed measurement and control system for industrial processes of the present invention.

Referring now to FIG. 1, generally designated at 10 is a block diagram illustrating the novel distributed control and measurement system for industrial processes of the present invention. The system 10 includes a plurality of programmable industrial measurement and control devices generally designated 12 to be described that are distributed about the floor of an industrial plant, not shown. The devices 12 are selectively connected to both continuous-type and discrete-type industrial process control actuators and sensors designated by a block 14 over analog input channels 16, digital input ports 18, analog output channels 20, and digital output ports 22. The analog inputs applied to the analog channels 16 may be selected from the group comprising cold junction compensated signals, low and high level analog voltage signals, 4–20 ma analog signal currents, RTD signals, strain gauge signals, and temperature signals, among others; the analog signals applied to the analog output channels 20 may be selected from the group comprising isolated and non-isolated 0–10 V signals and 4–20 ma current signals, among others; the digital signals applied to the digital input ports 18 may be selected from the group comprising low-level TTL, 90–280 VAC signals, and 10–30 VDC signals, among others; and the digital signals applied to the digital output ports 22 can be low-level TTL, 12–230 VAC output signals, and 2–200 VDC output signals, among others.

In a stand-alone mode, each of the programmable industrial measurement and control devices 12 is operable in a manner to be described to scan its analog input channels repetitively, to store data in predetermined locations representative of the state of its input channels, to repetitively evaluate at least one of a plurality of preselected industrial measurement and control functions on the stored data, and to actuate, on the basis of the evaluations, preselected output channels and ports for controlling the industrial process. The industrial measurement and control functions to be evaluated may include algorithms for comparing each of the inputs to predetermined reference levels provided therefor for determining thereagainst out-of-bounds conditions, PID loop control, and others to be described.

In a shared resources mode, a host system 24, which may be either a host processor or an interactive terminal, is connected to the plurality of programmable industrial measurement and control devices 12 via a multi-access, high-speed, local area network 26 to be described. The host system in the shared resources mode is selectively operable to monitor the state of the inputs and of the outputs of the devices 12, to down-load into predetermined memory locations provided therefor to be described industrial control and measurement parameters used by selected ones of the plurality of industrial measurement and control devices 12 during function evaluation, to directly control selected ones of the analog and digital output channels and ports of selected programmable industrial measurement and control devices, to control the operating states of the programmable industrial measurement and control devices, and to receive both routine and exception reports to be described from the devices 12 during normal, stand-alone, operation.

A gateway 28 is connected between the host system 24 and the local area network 26 via a RS-232-C serial interface 30. The gateway 28 includes a processor, not shown, operative in well-known manner to buffer messages between the host system and the local area network, and to convert from a host system ASCII-format character representation to any suitable network compressed-format character representation. The gateway 28 also serves as a surrogate host for the interactive terminal to reformat data therefor, and also for host processors employing DMA. A peripheral device 32, such as a graphics display or a printer, can be connected to the local area network 26 via another gateway 34, and a local area network 36 designated LAN', can be connected to the local area network 26 via another gateway 38.

The programmable industrial measurement and control devices 12 are nodes having individual network addresses, designated $N_1, \ldots N_k, \ldots N-3$, the host is a node having a network address designated $N_n$, and the peripheral device 32 and the second local area network 36 are nodes having network addresses designated $N_{N-1}, N_{N-2}$ respectively. The node addresses are preferably set by corresponding configuration switches 39. The switches 39 in the gateways 28, 34, 38 also specify baud rate to the local area network, baud rate from the network to the associated device, and the network-device data movement and control protocol including parity bit, intercharacter delay, and line feed among others. The switches 39 in the devices 12 also specify the type of signal conditioning to be described that is applied to the corresponding analog input channels.

Each of the devices 12, and the gateways 28, 34, and 38, include a full duplex universal asynchronous receiver transmitter (UART) 40 for receiving messages from, and transmitting messages to, the network 26. The general form of messages sent from the host to the gateway is: <nod add> <sep> <com> <typ> <sep> <mess par> <cr>, where "nod add" is the address of the node to be accessed, "sep" is a separator character, "com typ" is a mnemonic representive of the command type to be executed, "mess par" is a list of message parameters, and "cr" is an end of message indicator. The general form of messages from the gateway to the host is: <sou nod> <sep> <mess typ> <sep> <time stamp> <eoh> <lf> <list of resp elements> where "sou nod" is the address of the transmitting node, "sep" is a separator character, "mess typ" is a mnemonic representative of the message type, "time stamp" is a number indicating the time of message transmission, "eoh" is a character designating the end of a header, "lf" designates line feed, and "list of resp elements" is a list of response elements, when applicable.

Figure 2:
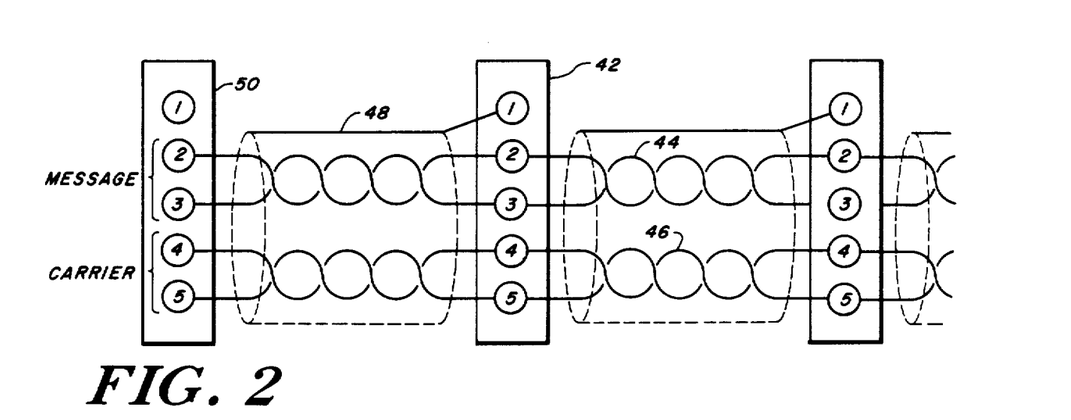
FIG. 2 is a schematic illustrating the wiring of the local area network of the distributed measurement and control system for industrial processes of the present invention.

Referring now to FIG. 2, generally shown at 42 is a schematic illustrating the wiring of the multi-access, high-speed, local area network of the distributed measurement and control system for industrial processes of the present invention. The multi-access, high-speed, local area network 42 includes first and second pairs of twisted-wire cables 44 and 46. The first pair of twisted-wire cables 44 is designated "message", and the second pair of twisted-wire cables 46 is designated "carrier". A shield 48 is provided around the pairs 44,46. The twisted-wire cable pair 44 is connected in parallel to corresponding ones of the UART's 40 (FIG. 1) of both the industrial measurement and control devices 12 (FIG. 1) and of the gateways 28, 34, and 38 (FIG. 1) via conventional plugs 50. The twisted-wire cable pair 46 is connected to the corresponding processors in parallel again via the plugs 50. The "message" pair 44 carries the transmitted and received messages having the above described formats one-at-a-time time sequentially thereover to and from the designated nodes. During message transmission, the processor of the transmitting node is operative to designate the "carrier" twisted-wire pair "busy", preferably by marking it with a logical "one". After transmission is complete, the processor of the transmitting node is operative to designate the link "not-busy", preferably by marking it with a logical "zero".

Figure 3:
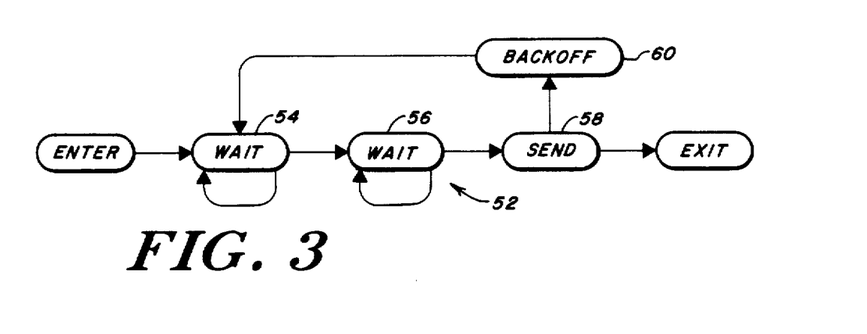
FIG. 3 is a state diagram illustrating the communications protocol of the distributed measurement and control system for industrial processes of the present invention.

Referring now to FIG. 3, generally designated at 52 is a state diagram illustrating a carrier sense, multiple access, collision detection (CSMA/CD) communications protocol of the distributed measurement and control system for industrial processes of the present invention. For message transmission, the processor of the transmitting node enters a waiting state designated 54, and is operative to determine whether a link is available. If a link is not available, it remains in the state 54. If a link is available, it enters a waiting state designated 56, and is operative to determine if the "carrier" twisted-wire pair 46 (FIG. 2) is a "one". If the "carrier" twisted-wire pair is a "one", it waits in the state 56 for a predetermined time interval, and then checks again. If the "carrier" twisted-wire pair is a "zero" at this time, the processor of the transmitting node enters a send state designated 58 and is operative to send the message over the network, and simultaneously compares the transmitted message with itself character-by-character. If it detects that the transmitted message is not the same as the message on the "message" twisted-wire pair 44 (FIG. 2), the processor is operative to determine that a collision between two or more nodes is occuring, it backs off as indicated by a state 60, returns to the state 54, and the process is repeated. It has been found that the local area network 42 (FIG. 2) implementing the above-described CSMA/CD communications protocol is capable of interconnecting over 2,000 analog input channels, 2,000 non-isolated analog output channels, 8,000 digital input ports and 8,000 digital output ports. The twisted-wire pairs can extend for over 4,000 linear feet above the plant floor, and provides up to a 28.8 K baud serial communications capability. Additional programmable industrial measurement and control devices 12 (FIG. 1) can be readily added to the network 26 (FIG. 1) to accommodate ex-post installation improvements and changes, and the system 10 (FIG. 1) can be expeditiously repaired, and malfunctioning units and subsystems replaced, without requiring lengthy and costly plant shutdowns.

Figure 4:
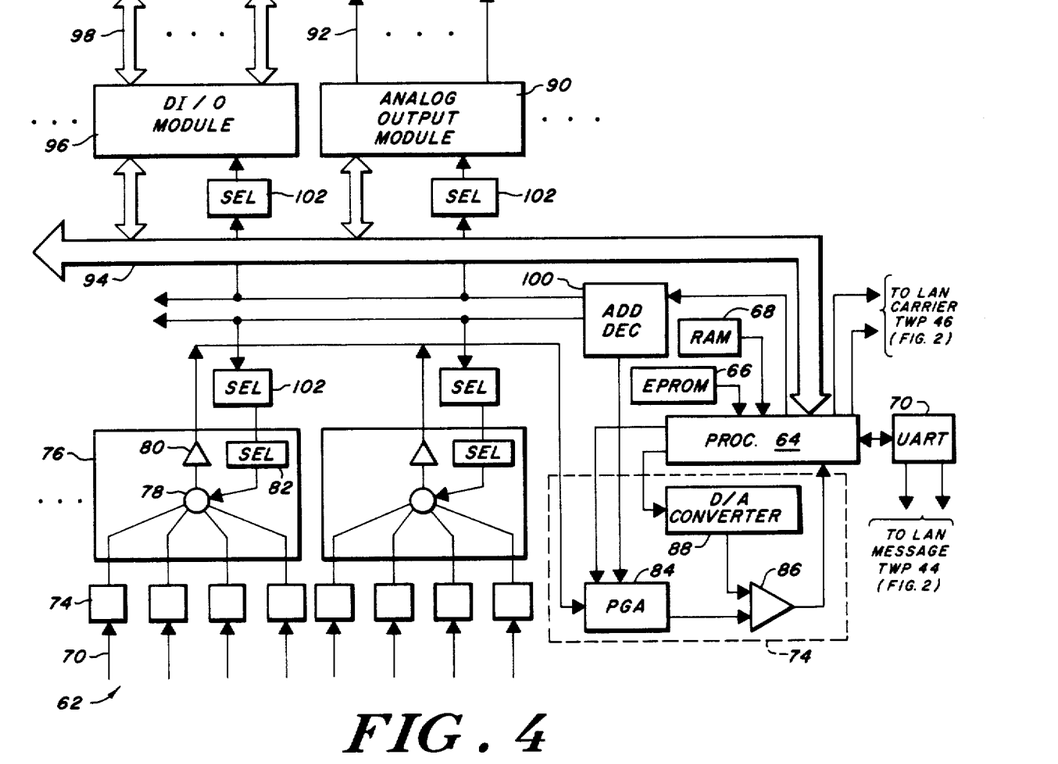
FIG. 4 is a schematic diagram illustrating the programmable industrial measurement and control devices of the distributed measurement and control system for industrial processes of the present invention.

Referring now to FIG. 4, generally shown at 62 is a schematic diagram illustrating one of the programmable industrial measurement and control devices of the distributed measurement and control system for industrial processes of the present invention. Each of the programmable industrial measurement and control devices 62 includes a processor 64 having the usual program ROM 66, preferably EPROM, the usual scratch-pad RAM 68, and a universal asynchronous receiver transmitter (UART) full-duplex modem 70. Preferrably, the processor 64 is an INTEL 8031 chip having the RAM 68 and the UART 70 fabricated on-chip.

A plurality of analog channels 70 are connected to the processor 64 over an analog bus 72, which is connected to an analog-to-digital convertor designated by a dashed box 74. The analog input channels 70 are individually calibrated for zero and span adjustment by conventional means designated by boxes 74, and are selectively conditioned, preferably four at a time, in analog signal conditioning modules 76. Any suitable modules 76 operative either to electrically isolate or amplify the input signals may be employed. Preferably, the modules 76 are selected from the group consisting of Analog Devices hybrid modules 2B54, 2B55, 2B34 and QMX01. The 2B34 hybrid module is selected for conditioning $\pm 25$ to $\pm 100$ mV low-level signals such as those produced by RTD and strain gauge sensors. The 2B54 hybrid module is selected for conditioning low-level analog ±25 to ±100 mV signals such as those produced by thermocouples or strain gauges, in circumstances where high common mode voltages are typical. The 2B55 hybrid module is selected to condition ±1 V to ±5 V or 4-20 ma analog input transmitter signals, in circumstances where high common mode voltages are typical. The QMX01 hybrid module is selected for conditioning analog signals having ranges from ±25 mV to ±10 V where low common mode voltages are typical. Each of the signal conditioning modules 76 includes a multiplexer 78, an amplifier and filter 80, and a channel selector 82 therein. The analog bus 72 preferably is a twisted-wire cable fabricated directly on a printed-circuit board, not shown, onto which the devices are mounted.

The analog-to-digital convertor 74 includes a programmable gain amplifier (PGA) 84 connected to one input of a comparator 86. The other input of the comparator 86 is connected to the output of a processor-controlled digital-to-analog convertor 88. The output of the comparator 86 is connected to the processor 64.

A plurality of analog output modules 90 each having a plurality of analog output channels 92 are connected to the processor 64 via a digital bus 94. A plurality of digital input/output modules 96 having a plurality of digital output ports 98 are connected to the processor 64 over the bus 94. The ports 98 each preferably include eight addressable bits. Any suitable digital I/O module 96 that provides either input or latched output of TTL digital signals may be employed. Any suitable analog output module 90 preferably having from one to four output channels providing D/A conversion may be employed. An address decoder 100 is connected to the processor 64 and to the peripherals 76, 90, and 96 via selectors 102 in the usual manner.

In operation, the processor 64 generates a plurality of addresses time sequentially which are individually decoded by the address decoder 100 to enable corresponding ones of the analog input channel selectors 102,82 to write the addressed selectively conditioned analog input signals onto the bus 72. For each of the addressed and selectively conditioned analog input signals written on the bus 72, the processor-controlled programmable gain amplifier 84 selectively amplifies the signal. For each selectively conditioned and amplified analog input channel signal, the processor is operative to provide a sequence of digital numbers to the digital-to-analog convertor 88, each of which are converted thereby to the corresponding analog signals. The comparator 86 is operative to compare the selectively conditioned and amplified input signals with successive ones of the analog signals provided by the digital-to-analog convertor 88 until such time as the two signals applied thereto are substantially equal. The processor is then operative to store the digital value of the selectively conditioned and amplified analog input signal in an address location in the RAM 68 provided therefor that corresponds to the particular analog input channel. The processor 64 performs the above-described analog input channel scanning procedure repetitively and maintains in the RAM 68 a list of digital values representative of the current state of corresponding ones of the selectively conditioned analog input channels 70.

Asynchronously with the above-described data collection procedure, the processor is operative in a manner to be described to repetitively evaluate at least one of a plurality of predetermined industrial measurement and control functions on the data representative of the current state of the analog input signals and on digital data from the digital input ports, and to actuate in accordance therewith the appropriate industrial controllers. Typical functions to be evaluated include maintaining a list in RAM of the principal variables associated with each of the analog input channels, comparing the principal values to preselected values down-loaded in RAM for monitoring out-of-limit conditions such as high and low alarm and warning levels, implementing PID loop control algorithms or ramp-soak algorithms, performing digital filtering, and linearizing thermocouple or strain gauge input signals, among others known to those skilled in the art. The processor 64 is also responsive in a manner to be described to messages received via the UART's 70 either from other programmable industrial measurement and control devices, or from the host or peripheral devices, over the local area network. The host system may, for example, request information representative of the current state of a particular bit of a digital input port, or may request a list of the parameters being used by a particular industrial measurement and control function. In such instances, the corresponding processor is operative to receive the message, decode it, and perform the specified command, and where applicable, prepare and send the appropriate reports. The processors 64 are also operative to prepare routine and exception reports. For routine reports, the processor prepares and reports a message to the host at selected regular intervals having data representative of the current state of preselected input channels from the list of principal variables in a manner to be described. Exception reports are prepared and sent by the processors at such irregular intervals when the list of principal values exceeds either high or low alarm and warning levels downloaded therefor by the host in a manner to be described.

Figure 5:
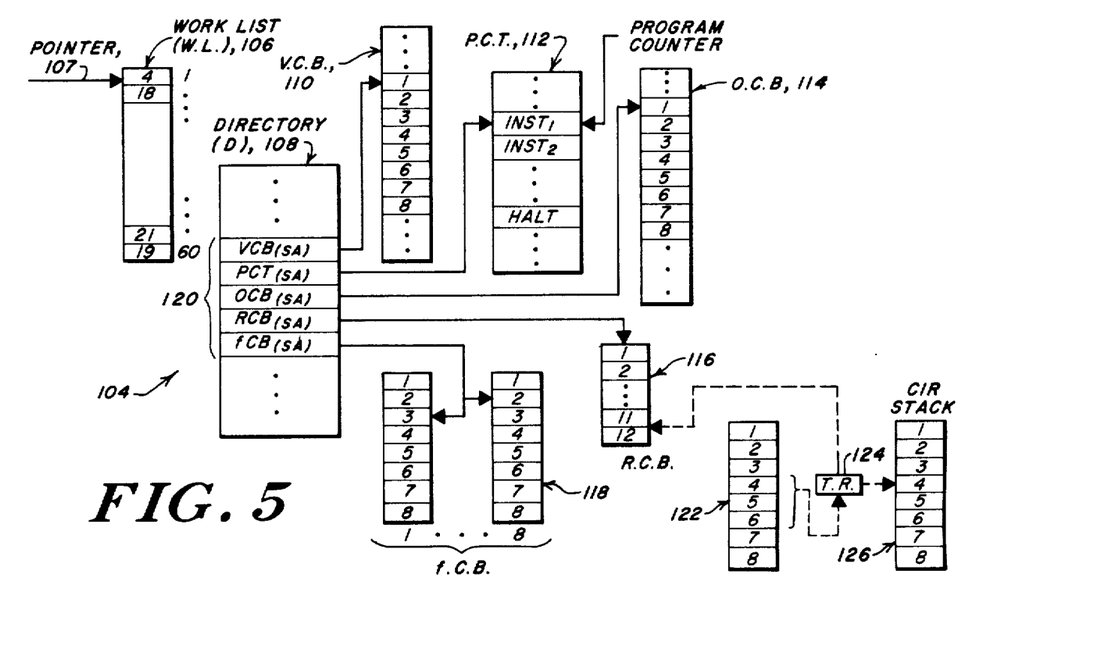
FIG. 5 is a schematic diagram illustrating the control and definition data structures of the programmable industrial measurement and control devices of the distributed measurement and control system for industrial processes of the present invention.

Referring now to FIG. 5, generally shown at 104 is a schematic diagram illustrating the control and definition data structures of the programmable industrial measurement and control devices which define the time sequence of repetitive function evaluation, the data structure to be manipulated by each of the functions, and the control structure for data manipulation after function evaluation. The control and definition data structures 104 include a work list (W.L.) generally designated 106, a directory (D.) generally designated 108, a variables control block (V.C.B.) generally designated 110, a program code table (P.C.T.) generally designated 112, an output control block (O.C.B.) generally designated 114, a report control block (R.C.B.) generally designated 116, and a function control block (F.C.B.) generally designated 118. For each function to be evaluated, a set of eight RAM working registers generally designated 122, a RAM transfer register 124, and eight RAM registers arranged as a circular stack generally designated 126 are provided. The registers 122 may be shared by different functions, or individually replicated therefor, without departing from the inventive concept.

The work list 106, in EPROM, has a list of entries, preferably 60, each of which designates by a number, such as 4, 18, 21, and 19, as illustrated, an industrial measurement and control function to be evaluated, as well as its associated data and control structures. A pointer 107, preferably incremented as a result of a clock controlled interrupt, steps through the entries in the table time sequentially for each tick of the clock. The pointer preferably steps to the next entry in the table 106 every 1/60th of a second, thus recycling back to the top of the list every second.

The directory table 108, in EPROM, contains pointers to the control and definition data structures of the industrial measurement and control function to be evaluated for each entry in the table 106. As designated by a bracket 120, for the entry in the table 106 illustrated by a "4", the directory 108 contains the starting addresses of the variables control block 110, of the program code table 112, of the output control block 114, of the report control block 116, and of the function control block 118.

Figure 6A:
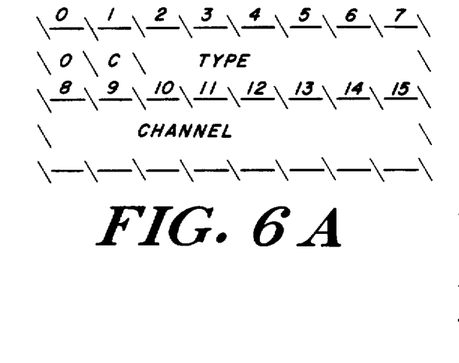
FIG. 6A is a diagram illustrating the format for one type of entry of the variables control block of FIG. 5.
Figure 6B:
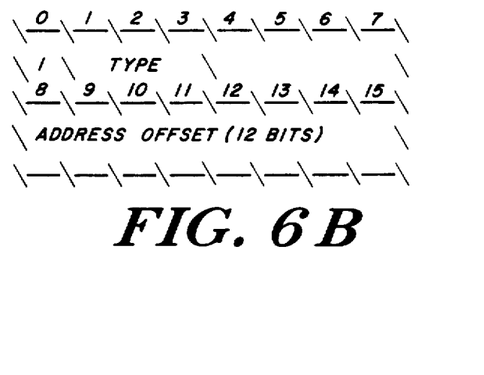
FIG. 6B is a diagram illustrating the format for another type of entry of the variables control block of FIG. 5.

The variables control block 110, in EPROM, for each starting address specified by the directory 108, preferably has eight entries, one for each of the eight registers 122, that specify the data structure for evaluation. Each entry in the variables control block 110 contains the following information: (a) the type of the variable (or constant), whether floating point or Boolean, (b) the address in RAM at which the variable is to be found if a constant, or a result stored either from another function evaluation or from a prior evaluation of the same function, (c) a channel address and type if the variable is an analog input signal, a digital input signal, or a digital output signal, and (d) an indication whether the variable is to be converted to engineering units. Preferably, Boolean format data is stored as 1 byte, and floating point format data is stored as 4 bytes. Preferably, the address in RAM at which variables are to be found are implemented as offsets from the beginning of the area where variables are stored during the above-described analog channel scan procedure, and as offsets from the area in RAM where constants are stored. If the entry in the variables control block is for an analog input channel, the format is as shown in FIG. 6A, where bit "zero" has a binary "zero" to designate an analog channel; and bit "one" designates by a letter "C" whether to convert to engineering units. Preferably, if "C" is equal to "1", a conversion is indicated. Bits "2–7" designate the "kind and type" of the variable. "00NNNN" designates a conditioned analog channel of type "NNNN", a "01CCCC" designates a zero, reference, or cold junction temperature of type "CCCC", a "10DDDD" designates digital inputs of type "DDDD", and a "11XXXX" is reserved for future kinds and types. Bits "8–15" designate the address of the input. If the entry is for a variable or constant, the format is as shown in FIG. 6B, where bit "zero" having a binary "1" designates that the entry is for a variable (or constant). Bits "1–3" designate the "type" of the variable. A "000" identifies "null" or no-entry for the corresponding one of the registers 122, a "001" identifies a floating point variable or constant, and a "010" identifies a Boolean variable or constant. Bits 4–16 designate the address of the variable or constant location in RAM.

The program code table 112, in EPROM, for each starting address specified by the directory 108, contains the instructions, in machine code, that specify the computations to be performed, the decisions to be made, and the sequencing including jumps of a plurality of predetermined industrial measurement and control functions to be evaluated on the data input structure specified by the variables control block 110. The directory 108 can address the same code in the program code table 112 for different input data structures specified by the variables control block 110 for each tick of the pointer, as well as for different output data and control structures specified by the output control block 114 to be described. Each addressable block of microcode in the program code table 112 concludes with a HALT instruction.

Figure 6C:
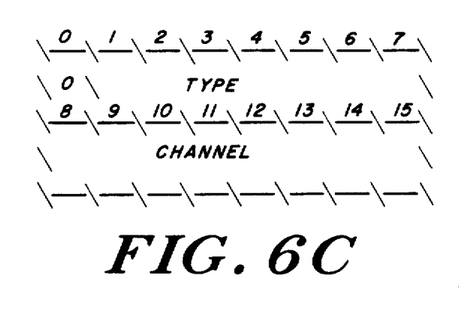
FIG. 6C is a diagram illustrating the format for one type of entry of the output control block of FIG. 5.
Figure 6D:
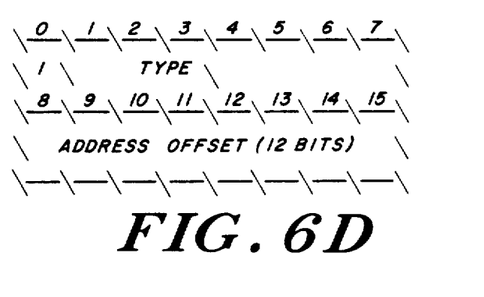
FIG. 6D is a diagram illustrating the format for another type of entry of the output control block of FIG. 5.

The output control block 114, in EPROM, for each starting address specified by the directory 108, preferably has eight entries, one again for each of the eight registers 122. Each entry specifies the control structure for data manipulation to be stored in the register set 122 after function evaluation. Each entry includes the following information: (a) the type of the variable to be stored, whether floating point or Boolean, (b) the address in RAM to which the variable is to be written for either a subsequent evaluation of the same function or for another function that is implemented as an offset from the beginning of the data area where variables and constants are stored, and (c) the channel address and type if the variable is for an analog output channel or digital output port. An entry in the output control block for each function to be evaluated preferably specifies which one of the registers 122 is transferred to the report control block 116 to be described to maintain a list of principal variables. If the entry in the output control block is for an analog or a digital output, the format is shown as in FIG. 6C. Bit "0" is a "0" to designate an output channel. Bits "1–7" designate the "type" of the variable using substantially the same bit fields therefor as described above in connection with FIG. 6A, with the addition of "100AAA" designating an analog output channel. Bits "8–15" designate the address of the particular analog or digital output channel or port. If the entry in the output control block is for a variable, the format is as shown in FIG. 6D, where the meaning of the bit field is the same as that described above in connection with FIG. 6B.

Figure 6E:
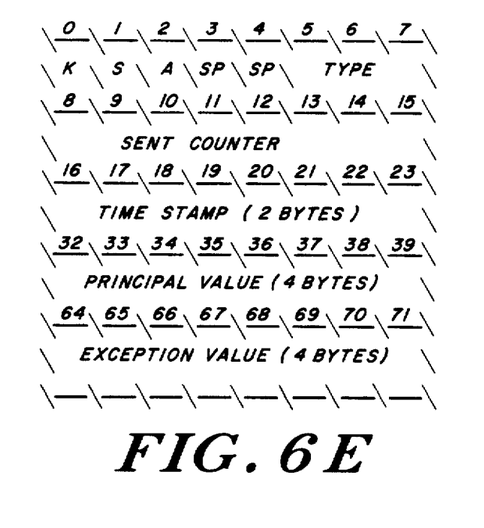
FIG. 6E is a schematic diagram illustrating the format for entries of the report control block of FIG. 5.

The report control block 116, in RAM, includes twelve addressable eight bit registers. The report control block, for each starting address specified therefor by the directory 108, has the following information: (a) the principal variable that the corresponding function monitors such as an analog input signal appearing on a specific channel, (b) an indication whether the variable is to be skipped during routine analog channel principal variable reporting, (c) the full value of the variable for exception reporting when it exceeds predetermined limits, (d) a flag that indicates whether a report has been sent to the host on a variable, (e) an indication of the type of the report, for example, whether above or below a predetermined reference level such as the high or low alarm or warning limit values, (f) an indication whether the principal value is to be reported during out-of-limits conditions during exception reports, (g) a counter which is implemented each time an exception report is generated, and (h) a time stamp. Entries for the report control block 116 have the format shown in FIG. 6E. A "1" in bit "0" designates that the principal value for the corresponding analog input channel is to be skipped during routine reporting. A "1" in bit "2" designates that an exception report has been sent on the occurance of an out-of-limits condition. Bits "3" and "4" are reserved for future use. Bits "5–7" designate the type of exception report, where a "0" indicates no exception report is in effect, a "1" designates a high alarm value, a "2" designates a high warning value, a "3" designates a low warning value, and a "4" designates a low alarm value during exception reports, if any. Bits "8–15" are used to count the number of 1/60's of a second since the last exception report was sent to the host system. When the counter decrements to zero, the exception report is sent. Bits "16–31" are used to record the time at which the exception condition was first detected. Bits "32-63" are used to contain the value of the principal variable. Bits "64-95" are used to contain the value of the variable at the time the exception condition occured.

The function control block 118, in RAM, preferably includes eight blocks of eight registers each. The function control block 118 for each starting address specified by the directory 108 specifies the adjacent RAM addresses for the locations containing the parameter values that are downloaded by the host for use by the programmable measurement and control devices for principal variables limit checking and for PID control, ramp/soak, and other industrial measurement and control algorithms. The function control block includes the following information: the address of the high alarm value, the address of the high warning value, the address of the low alarm value, the address of the low warning value, the addresses of the digital output channels to be actuated on the appearance of a high alarm or warning condition, and the addresses of the digital output channels to be actuated on the occurance of a low warning or alarm condition.

Figure 7:
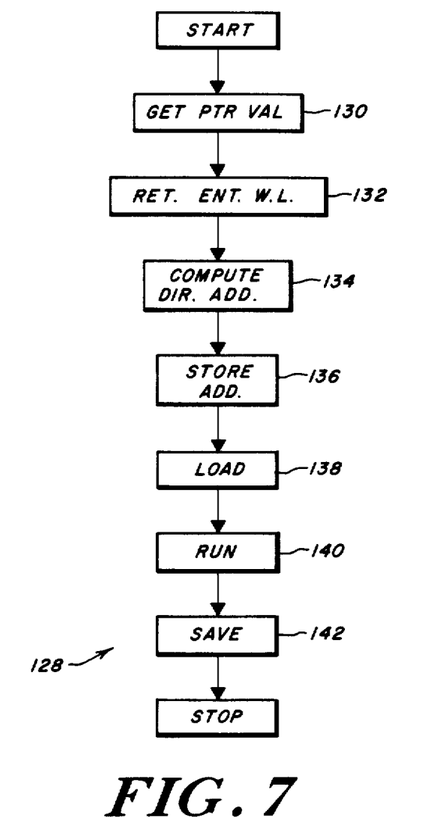
FIG. 7 is a flow chart illustrating the flow of processing linking the data and control structures of FIG. 5.

Referring now FIG. 7, generally shown at 128 is a flow chart illustrating the flow of processing linking the data and control structures of FIG. 5. For each tick of the pointer 107 (FIG. 5), the processor is operative to get the value of the pointer as shown by a block 130, to retrieve the corresponding entry in the work list specified thereby as shown by a block 132, to compute therefrom the starting address of the corresponding entry in the directory 108 (FIG. 5) as shown by a block 134, and to save it as shown by a block 136. As shown by a block 138, the processor is then operative in a manner to be described to load the appropriate eight registers 122 with the data structure therefor specified by the variables control block 110 (FIG. 5). As shown by a block 140, the processor is then operative in a manner to be described to run the corresponding function to be evaluated as specified by the program code table 112 (FIG. 5) for each tick, using, where appropriate, any parameter values specified therefor by the corresponding function control block 118 (FIG. 5). As shown by a block 142, the processor is then operative in a manner to be described to save in the registers 122 the evaluated data, where appropriate, according to the data control structure specified therefor by the output control block 114 (FIG. 5) and to actuate, where appropriate, the specified analog or digital output channels. If more than 1/60th of a second is required, the above-described process continues into the next tick of the pointer 107 until completed.

The processor is operative to perform the above-described procedure for each tick of the pointer 107 (FIG. 5) when in the stand-alone mode. When interrupts are generated, for example, during message receipt over the local area network 24 (FIG. 1) from the host, or during the time designated for generating routine reports to the host, or for generating out-of-limits exception reports, among others, the processor is operative to stack away the status of the machine and either to generate the appropriate reports or respond to the message, and then returns to the place where it was interrupted.

Figure 8:
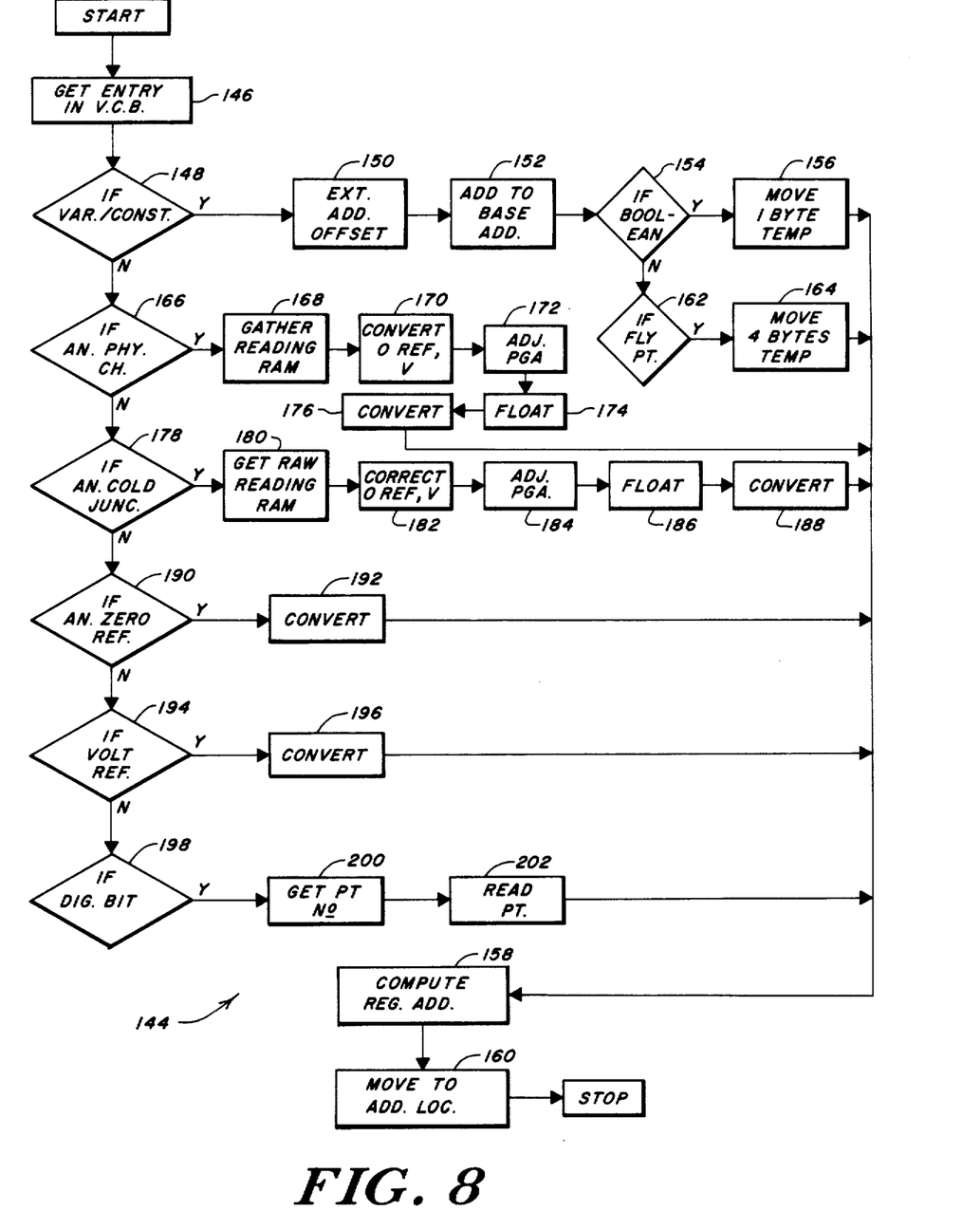
FIG. 8 is a flow chart detailing the flow of processing of the load step of FIG. 7.

Referring now to FIG. 8, generally designated at 144 is a flow chart illustrating the load step 138 of FIG. 7. The processor is operative to get each entry one-at-a-time from the variables control block 110 (FIG. 5) as shown by a block 146. As shown by a block 148, if the entry is for a variable or for a constant, the processor is operative to extract the address offset as shown by a block 150, and to add it to the base address provided therefor in RAM as shown by a block 152. If the variable or constant is a Boolean value as shown by a block 154, the processor is operative to move one byte of data from the specified RAM address location to a temporary variable register as shown by a block 156, then to compute the address of the register 122 (FIG. 5) into which it is to be moved as shown by a block 158, and then to move the contents of the temporary variable register into the addressed register as shown by a block 160. If the variable or constant is in floating point format as shown by a block 162, the processor is operative to move four bytes as shown by a block 164 of the contents of the specified RAM address location into a temporary variable register, and the steps 158 and 160 are repeated.

As shown by a block 166, if the entry in the variables control block 110 (FIG. 5) is for an analog physical channel, the processor is operative to get the raw reading from the RAM location provided therefor for that channel as shown by a block 168, to compute the zero reference voltage as shown by a block 170, to adjust the reading for the value of the programmable gain amplifier 84 (FIG. 4) as shown by a block 172, to float the result as shown by a block 174, and to convert the data into engineering units where applicable as specified by the above-described "C" bit as shown by a block 176. The processor then repeats the steps 158 and 160. As shown by a block 178, if the entry in the variables control block 110 (FIG. 5) is for an analog cold junction, the processor is operative to get the raw reading from the RAM location provided therefor is shown by a block 180, to compute the zero reference voltages therefor as shown by a block 182, to adjust the reading for the value of the PGA 84 (FIG. 4) as shown by a block 184, to float the result as shown by a block 174, and to convert the data into engineering units where applicable as shown by a block 188. The processor then repeats the steps 158 and 160.

As shown by blocks 190 and 194, if the entry is for an analog zero reference or a voltage reference, the processor is operative to convert into engineering units where applicable as shown by blocks 192 and 196, and the steps 158 and 160 are repeated. As shown by a block 198, if the entry in the variables control block 110 (FIG. 5) is for a digital bit, the processor is operative to get the port number as shown by a block 200, to read the port as shown by a block 202, and the steps 158 and 160 are repeated.

Figure 9:
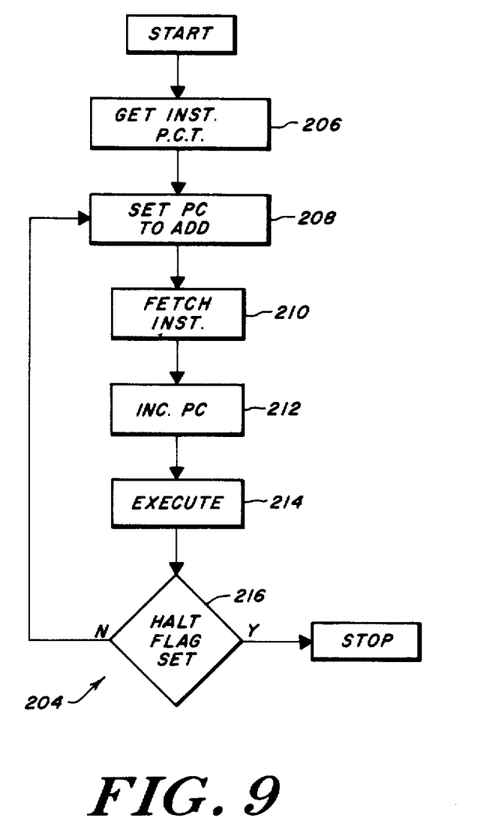
FIG. 9 is a flow chart detailing the flow of processing of the run step of FIG. 7.

Referring now to FIG. 9, generally designated at 204 is a flow chart illustrating the run step 140 of FIG. 7. The processor is operative as shown by a block 206 to get each one of the instructions of the corresponding industrial measurement and control function to be evaluated from the program code table 112 (FIG. 5) as shown by a block 206 specified by the directory 108 (FIG. 5) starting address. The processor is then operative to set its program counter to the address as shown by a block 208. The processor is then operative to fetch the addressed instruction as shown by a block 210, to increment its program counter as shown by a block 212, and to execute the instruction on the circular stack as shown by a block 214. As shown by a block 216, if the instruction is not the HALT instruction, the steps 208, 210, 212, 214, and 216 are repeated.

Figure 10:
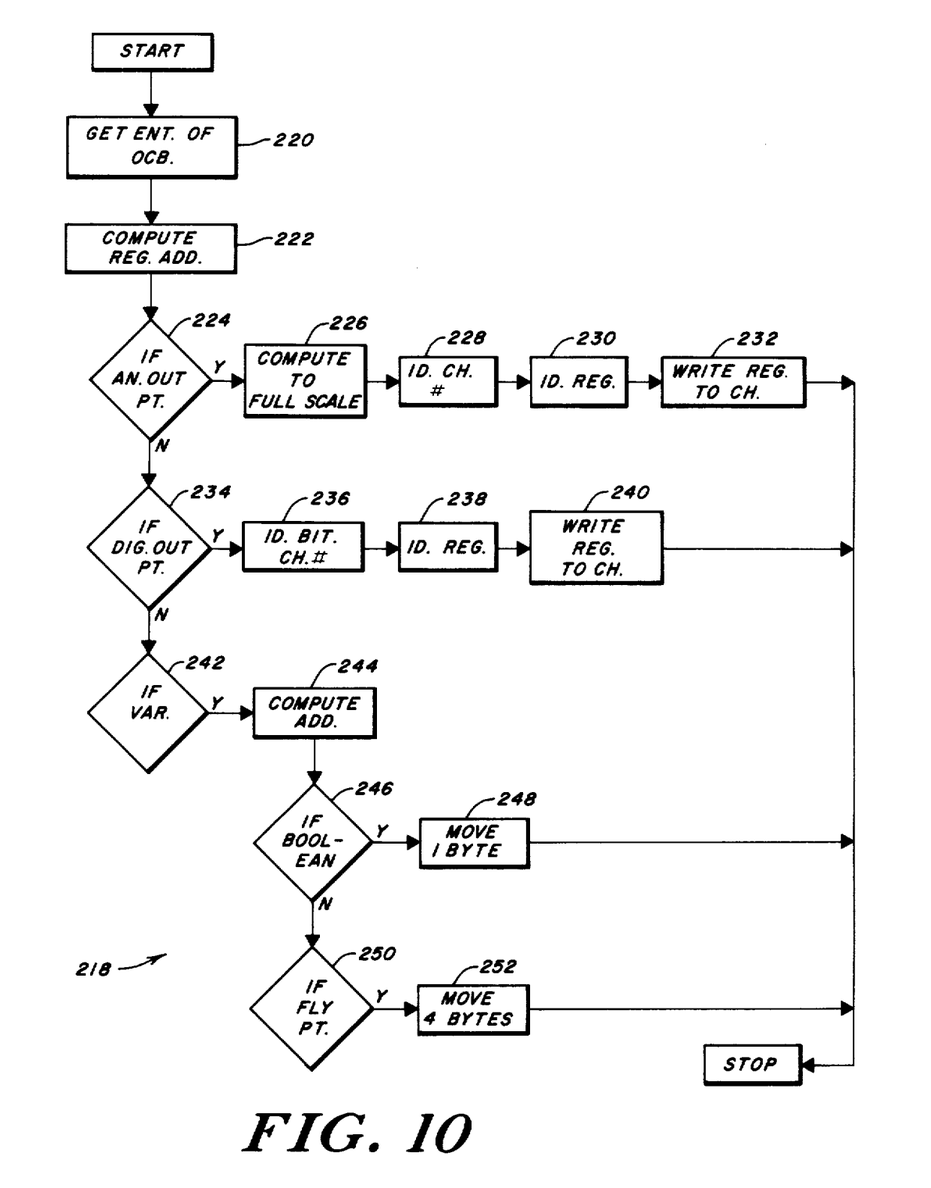
FIG. 10 is a flow chart detailing the flow of processing of the save step of FIG. 7.

Referring now to FIG. 10 generally designated at 218 is a flow chart illustrating the run step 142 of FIG. 7. The processor is operative to get each entry in the output control block 114 (FIG. 5) as shown by a block 220. The processor then computes the corresponding register address therefrom as shown by a block 222. If the entry is for an analog output as shown by a block 224, the processor is operative to convert the value there specified to a fraction of full scale as shown by a block 226, to identify the analog output channel to which the converted value is to be applied as shown by a block 228, to set a pointer to identify the register as shown by a block 230, and then to write the value thereat to the specified channel as shown by a block 232.

As shown by a block 234, if the entry is for a digital output, the processor is operative to identify the bit channel number as shown by a block 236, to set a pointer to identify the register as shown by a block 238, and to write the contents of the register to the identified channel number as shown by a block 240.

If the entry is for a variable as shown by a block 242, the processor is operative to compute the address to which the variable is to be saved as shown by a block 244. As shown by a block 246 if the saved value is in Boolean format, the processor is operative to move one byte thereinto as shown by a block 248. As shown by a block 250, if the variable is in floating point format, the processor is operative to move four bytes thereinto as shown by a block 252.

It will be appreciated that many modifications of the presently disclosed invention will be apparent to those skilled in the art without departing from the inventive concept.

What is claimed is:

1. A distributed measurement and control system for industrial processes having a plurality of industrial sensors and industrial controllers, comprising:
   a host system;
   a local area network coupled to said host system;
   at least one programmable industrial measurement and control device coupled to said local area network;
   said at least one industrial measurement and control device including;
   a processor having a program ROM and a scratch pad RAM;
   first means coupled to said processor for providing a plurality of analog input channels for receiving a like plurality of input signals from individual ones of said industrial sensors;
   second means coupled to said analog input channels and to said processor for selectively conditioning said plurality of analog input signals;
   third means coupled to said processor and to said second means for repetitively providing digital data representative of corresponding ones of said selectively conditioned analog input signals;
   fourth means coupled to said processor for providing a plurality of output signal channels connectable to individual ones of said industrial controllers; and
   fifth means coupled to said processor and to said third and fourth means for repetitively evaluating at least one of a plurality of predetermined measurement and control functions on said data and for actuating in accordance therewith preselected ones of said output signals, said fifth means including a plurality of RAM working registers, a pointer controlled ROM work list for defining the time sequence of functions to be evaluated, a ROM directory table for defining the starting addresses for the control and data structures for each of the functions to be evaluated, a ROM variables control block having for each starting address specified therefor by the directory a table defining RAM addresses for the data structure to be loaded into the RAM working registers for evaluation, a ROM output control block having for each starting address specified therefor by the directory a table defining the RAM addresses for the data and control structures for the RAM working registers after function evaluation, and a ROM program code table having for each starting address specified therefor by the directory a table of instructions in microcode defining individual ones of said at least one of said plurality of predetermined functions to be evaluated.

2. The system of claim 1, wherein said host system includes a processor.

3. The system of claim 1, wherein said host system is an interactive terminal.

4. The system of claim 1, wherein said local area network includes first and second twisted-wire cable pairs.

5. The system of claim 4, further including a universal asynchronous receiver transmitter, and wherein said first twisted-wire cable pair is connected to said universal asnychronous receiver transmitter, and wherein said second twisted-wire cable pair is connected to said processor.

6. The system of claim 1, wherein said second means are integrated circuits selected from the group consisting of Analog Devices hybrid modules numbers 2B54, 2B55, 2B34, and QMX01.

7. The system of claim 1, wherein said third means includes an analog bus connected to said plurality of analog input channels, a programmable gain amplifier connected to said analog bus, a processor-controlled digital-to-analog convertor, and a comparator, one input to said comparator being connected to the output of said digital-to-analog convertor, the other input of said comparator is the output of said programmable gain amplifier.

8. The system of claim 1, wherein said fifth means further includes a RAM function control block having for each starting address specified therefor by said directory a plurality of RAM address that specify the locations of RAM registers having parameter values for use during evaluation of corresponding ones of said at least one function.

9. A programmable industrial measurement and control device for industrial processes having a plurality of industrial sensors and industrial controllers, comprising:
   a processor having a program ROM and a scratch pad RAM;
   first means coupled to said processor for providing a plurality of input signals from individual ones of said industrial sensors;
   second means coupled to said analog input signals and to said processor for selectively conditioning said plurality of analog input signals;
   third means coupled to said processor and to said second means for repetitively providing digital data representative of corresponding ones of said selectively conditioned analog input signals;
   fourth means coupled to said processor for providing a plurality of output signal channels connectable to individual ones of said industrial controllers; and fifth means coupled to said processor and to said third and fourth means for repetitively evaluating at least one of a plurality of predetermined industrial measurement and control functions on said data, said fifth means including a plurality of RAM working registers, a pointer controlled ROM work list for defining the time sequence of functions to be evaluated, a ROM directory table for defining the starting addresses for the control and data structures for each of the functions to be evaluated, a ROM variables control block having for each starting address specified therefor by the directory a table defining RAM address for the data structure to be loaded into the RAM working registers for evaluation, a ROM output control block having for each starting address specified therefor by a directory the RAM addresses for the control and data structures to be loaded in the RAM working registers after function evaluation, and a ROM program code table having for each starting address specified therefor in the directory the microcode instructions that define corresponding ones of said at least one of said plurality of predetermined functions to be evaluated.

10. The device of claim 9, wherein said second means are integrated circuits selected from the group consisting of Analog Devices hybrid module numbers 2B54, 2B55, 2B34, the QMX01.

11. The device of claim 9, wherein said third means includes an analog bus connected to said plurality of analog input channels, a programmable gain amplifier connected to said analog bus, a processor-controlled digital-to-analog convertor, and a comparator, one input to said comparator being connected to the output of said digital-to-analog convertor, the other input of said comparator is the output of said programmable gain amplifier.

12. The device of claim 9, wherein said fifth means further includes a RAM function control block having for each starting address specified therefor by the directory a plurality of RAM address that specify the locations of RAM registers having parameter values for use during evaluation of corresponding ones of said at least one function.

* * * * *